United States Patent Office 2,889,192
Patented June 2, 1959

2,889,192

METHOD OF TREATING CELLULOSE-CONTAINING TEXTILE MATERIALS, MATERIALS SO TREATED AND DIESTER COMPOSITION THEREFOR

Amedeo Filiberto D'Adamo, Jr., North Plainfield, and William Julius van Loo, Jr., Middlesex, N.J., assignors to American Cyanamid Company, New York, N.Y., a corporation of Maine No Drawing. Application December 19, 1956
Serial No. 629,221

20 Claims. (Cl. 8—115.6)

The present invention relates to the novel treatment of cellulosic textile materials and to the novel composition employed in the treatment.

In the past, the textile industry has used many finishes of the resin type to impart wrinkle recovery and dimensional stability to cellulosic textile materials. One of the first of these resins to be used was the urea-formaldehyde type. This product has a serious deficiency in that the loss of tensile strength following chlorine bleaching was excessive. Another deficiency in this resin type was the high concentration required to impart desirable properties to cellulosic materials, which high concentration intensified the tensile strength deficiency borne of chlorine absorption.

Gradually, the urea-formaldehyde resins were supplanted to a considerable extent by melamine-formaldehyde resins which impart wrinkle recovery to cellulosic materials at much lower solids concentrations than the urea-formaldehyde resin, without loss of tensile strength following chlorine bleaching. However, the melamine-formaldehyde resins have a tendency to discolor when exposed to chlorine bleaching, which to some extent limits their use, particularly on white fabrics.

A third type of resin, the ethylene urea-formaldehyde resin, has been employed and to a certain extent offers a compromise between the deficiencies of the urea-formaldehyde resins and the melamine-formaldehyde resins in that they impart a wrinkle recovery similar to that obtained with melamine-formaldehyde resins at the same resin concentration and yet do not discolor following chlorine bleaching. However, a tensile strength loss intermediate between that incurred by urea-formaldehyde and melamine-formaldehyde resins is observed on cellulosic materials when materials so treated are scorched following chlorine bleaching.

Therefore, it is an object of the present invention to provide a treating composition which contains a select group of compounds, for cellulosic textile materials and the method of treating such textile materials whereby the treated fabric will have a high order of wrinkle recovery and dimensional stability.

It is another object to provide such a composition and method of treating cellulosic textile materials whereby tensile strength loss of the treated material is minimized when the material is scorched following chlorine bleaching.

It is a further object to provide such a composition and method of treating cellulosic textile materials whereby the treated material will not discolor after repeated chlorine bleaching.

A further object is to provide such a composition which may additionally and advantageously contain heat-curable aminoplast resins to impart desirable properties to textile materials.

A still further object is to provide a composition containing said selected group of compounds and said aminoplast resins, which when applied to cellulosic textile materials, and more particularly to rayon, impart an unexpected degree of shrinkage control thereto.

These and other objectives and advantages are accomplished by a process comprising treating textile materials containing cellulose with a composition comprised of a diester having the following general formula:

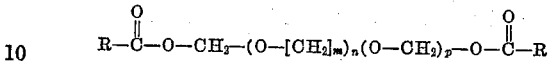

wherein R is selected from the group consisting of H and alkyl, $n$ is an integer greater than $-1$, $m$ is an integer greater than O, and $p$ is 1, except when $n$ is 0, when it can be 0 or 1, and an acid acting curing catalyst. Thereafter, the fabric is subjected to an elevated temperature to dry and cure said treating composition.

Examples of suitable compounds falling within the scope of the generic formula set forth hereinabove, which compounds may be generically termed diesters of oxymethylene glycols, are oxy methylene diacetate, oxy dimethylene diacetate, oxy pentamethylene diacetate, oxy methylene diformate, oxy dimethylene diformate, oxy methylene dipropionate, oxy methylene distearate, oxy methylene diacrylate, oxy dimethylene dilactate, ethylene-bis(oxymethylene)diacetate, ethylene-bis(oxymethylene) dipropionate, and propylene bis(oxymethylene) diformate, among others. Of all of the compounds included within the generic formula, those in which $n$ is 0, $p$ is 1, and R is a saturated alkyl group containing from 1 to 5 carbon atoms are greatly preferred, because of their relative ease of synthesis, cost considerations, and their solubility characteristics.

Certain compounds falling within the generic formula set forth hereinabove have been prepared in the past. Thus, for example, the compound in which R is $CH_3$, $n$ is 0 and $p$ is 1 has been made by the reaction between acetic anhydride and paraformaldehyde. Staudinger (Ann. 475, 195–197 [1929]).

As illustrative of the Staudinger process, 2 moles of paraformaldehyde and 1 mole of acetic anhydride were reacted in the presence of 0.05 mole of a catalyst. The reagents were maintained in the presence of zinc chloride at 110° C. for 24 hours, after which the reaction mixture was extracted with chloroform. This solvent was then removed at atmospheric pressure and the residue vacuum distilled. The first fraction removed contained 44 grams of oxy methylene diacetate. The second fraction contained 56 grams of oxy dimethylene diacetate, and the third fraction, which was the pot residue consisting of higher oxy methylene diacetates, contained 110 grams. The three fractions contained 65% of formaldehyde releasing compounds, were totally soluble in acetone, forming a solution which, upon the addition of water, separated into two phases. Any of these fractions alone, or any combination thereof, would be highly acceptable for applicants' purposes.

The compound in which R is $CH_3$, $m$ is 2 and $p$ and $n$ are 1 has been prepared by reacting sodium acetate with bis chloromethyl ether of ethylene glycol, in the absence of any solvent for the reaction. Walker (Plastic Products 9, 187–8 [1933]).

A further method for producing the diesters of oxy methylene glycols of the present invention, where high yields of relatively pure compounds or complex mixtures of the subject diesters may be prepared, is fully described in copending U.S. application, Serial No. 629,226, filed December 19, 1956.

This process relates to reacting a bis-halo-methyl ether with a salt of a carboxylic acid and a mono- or diacidic inorganic alkali as alkali metal hydroxides, ammonium or alkaline earth metal hydroxides. The essential feature of the improved process above referred to lies in the use of a particular solvent, which enables the process to give superior yield and product.

The solvent employed is an organic liquid in which the metal or ammonium carboxylic acid salt is soluble, but the corresponding metal or ammonium halide produced in the reaction is not. Several types or classes of solvents may be employed. The preferred solvent is the acid corresponding to the anion of the carboxylic acid salt, such as formic, acetic, and butyric acid, and the like.

Another class of solvent is the lower alkanols or glycols, and additionally dimethyl formamide and its homologues and dimethyl sulfoxide and its homologues may be employed. The solvent must contain no groups which will interfere with the principal reaction.

As illustrative of this process, 57.5 grams (0.5 mole) of bis-chloromethyl ether was added dropwise over a 1-hour period to 68.0 grams (1 mole) of sodium formate, in 200 millimeters of dry dimethyl formamide, with vigorous stirring at 90° C. The mixture was cooled to room temperature and allowed to stand for four hours.

The precipitated sodium chloride was filtered and washed with dimethyl formamide. The combined filtrate was vacuum distilled and a fraction weighing 28 grams and boiling at 70° C. at 1 mm. mercury pressure was collected. The yield was 40%. The product is principally oxy dimethylene diformate.

As noted above, the diesters of oxy methylene glycols of the present invention may be employed singly or in combination, including complex mixtures thereof. Since the mixtures for most purposes perform equally as well in the present invention as single substantially pure compounds, and in view of the fact that they are less costly to produce, they are usually preferred. No specific ratios of the various mixed diesters appear to be in any way critical, and for the most part the results of the normal reaction procedures followed by elementary purifying steps, such as removal of sodium chloride in the above illustrative example, produce highly operable mixtures.

Mixed diesters of oxy methylene glycols include by way of example complex mixtures of the diesters of oxy methylene glycols, dioxy trimethylene glycols, trioxy tetramethylene glycols, tetraoxy pentamethylene glycols, and the like.

While the diesters of oxy methylene glycols of the present invention are polymeric in form, they are not characterized as being resins, since in the use of textiles they do not perform as resins of the type usually employed in the treatment of textile materials.

One of the features of the present invention is that the diesters of oxy methylene glycols may be employed with conventional aminoplast resins in the treatment of textile materials, to impart various added qualities thereto. These aminoplast resins are preferably substantially water-soluble, or at least not hydrophobic. Thus, for example, urea-formaldehyde resins, including the cyclic ureas, such as ethylene urea, 1,2-propylene urea, 1,3-propylene urea, and their alcohol or alkylated derivatives may be used. Guanamines and substituted guanamine-formaldehyde reaction products and their alkylated derivatives and aminotriazine-formaldehyde reaction products and their alkylated derivatives may be employed. In the latter group, melamine, particularly polymethylol melamines, and their alkylated derivatives containing from 2 to 6 alkoxy groups are preferred. Suitable aminoplasts may be used singly or in combination with one another.

In the treatment of textile materials, the diesters of this invention are thought to decompose and release formaldehyde or formaldehyde-containing fragments, which are believed to react with the cellulosic material in a manner analogous to that of formaldehyde.

If the diester of oxy methylene glycol is used in conjunction with a conventional aminoplast resin of the type described hereinabove, numerous potential reactions may occur. Thus, both the resin and the diester may react independently with the cellulosic material or the diester may react with the cellulosic material followed by this reaction product reacting with the resin. Additionally, the reaction product of the diester and the resin may in turn react with the cellulose or simultaneously the diester, resin and cellulose may co-react.

Regardless of whether the diesters are used alone or in combination with the aminoplast, and regardless of any theory to which their beneficial effects may be ascribed, the treatment of textile materials according to the present invention results in the numerous advantages, such as wrinkle recovery, low tensile strength loss following chlorine bleaching, minimum discoloration following chlorine bleaching, and other desirable properties heretofore mentioned and hereinafter to be more fully illustrated.

The textile treating compositions employed in the present invention may be prepared in a number of ways. The following are illustrative:

SOLUTIONS (1) A solution of oxy dimethylene diacetate (ODD) or mixed oxy methylene diacetate (OMD) may be prepared by dissolving either of these components in a 15–20 acetone-water solution and used alone or in combination with a thermosetting aminoplast type resin.

(2) Equal parts by weight of any conventional non-ionic surface active agent, such as Deceresol NI Conc. (the reaction product of 9.5 moles of ethylene oxide and 1 mole of nonyl phenol) and ODD or OMD are mixed to form a solution. Sufficient of this 50% ODD or OMD solution as, for example, 2 parts, is added to an aqueous solution thermosetting aminoplast resin, for example, 3.5 parts of trimethoxymethylol melamine and 0.42 part of magnesium chloride in 94.08 parts of water. The resulting composition contains 3.5% of melamine resin and 40% magnesium chloride catalyst based on the weight of the resin and 1% ODD or OMD, the percentage of the melamine and diacetate products being based on the weight of the solution.

OIL-IN-WATER EMULSIONS

The ODD or OMD composition may be prepared as an oil-in-water emulsion by first preparing a solution containing 25 parts of the selected diester component, here ODD, in 25 parts of xylene or other suitable hydrocarbon solvent. A second mixture contains 5.0 parts of Pluronic L54 (ethylene oxide condensed with a base formed by the condensation of propylene oxide with propylene glycol) and 12.5 parts of water.

The second mixture is stirred vigorously in a high speed mixer and the first mixture is slowly added to the second, with stirring. The addition of the first mixture to the second causes the resultant mixture to thicken. This mixture is then removed from the high speed stirrer and 32.5 parts of water is added slowly and with slow stirring. The resulting product is a 25% oil-in-water emulsion which is readily dilutable with water. Four parts of this emulsion may be readily substituted for 2 parts of the ODD solution and 2 parts of water, described in (2) under Solution above, to give a 1% ODD composition similar to that described.

It is an advantage of the present invention that the diesters may be used inn treating compositions having concentrations of from 0.5 to 15% of the diesters, based on the solution weight. Excellent results are obtained with the solution containing from about 2 to about 6% thereof by weight. It should be understood that these concentrations of solutions are for fabrics where the pick-up or add-on is about 100% from the treating bath, thus leaving an amount of solids on the fabric equivalent to the diester concentration of the solution. Thus, in most instances, the amount of diester solids based on dry fabric weight is from about 0.5 to 15% and preferably from about 2 to 6%.

When the diesters are used with heat-curable aminoplast resins, the treating composition may contain from between 0.5 to 15% diester and from 1 to 25% aminoplast resin. Preferably, the treating composition should contain from about 2 to 6% diester and from about 2 to about 10% aminoplast resin, with the treated textile material containing equivalent percentages based on its dry weight.

The present treating compositions are preferably employed with an accelerator or acid acting curing catalyst. These materials may be employed in amounts from about 1 to 60%, and preferably from about 2 to 25%, based on the weight of the curable resin solids of the treating composition employed, i.e. the diesters and aminoplast components. Examples of suitable curing catalysts include ammonium salts, such as ammonium chloride, amine salts like triethylamine hydrochloride, alkanolamine salts like triethanolamine hydrochloride, metal salts such as magnesium chloride, zinc nitrate and certain free acids such as acetic, tartaric, lactic, and the like may be employed.

When the fabric has been treated, it is then dried. This may be accomplished by employing temperatures of the order of from 175° F. to 275° F. until the fabric is dry. Thereafter, it is subjected to an elevated temperature in order to effect the proper cure which includes temperatures of from about 5 minutes at 300° F. to ½ minute at 450° F.

The composition of the present invention may be applied to the textile material by spraying, dipping, padding, or other techniques well known to those skilled in the art.

In employing the diester composition of the present invention alone, initial tensile strength losses have been indicated. These losses may be mostly overcome by substituting for some of the diesters of oxy methylene glycols in the treating composition, a thermosetting aminoplast type resin. In addition to this beneficial result achieved from such combinations, other advantages will hereinafter become apparent. Further, a synergistic effect has been noted in such a combination when it is applied to cellulosic materials and in particular viscose rayon.

In the tables hereinbelow, certain test values are recorded therein. These include reflectance on a spectrophotometer against a magnesium carbonate standard at 450 mμ for color, grab tensile strength values obtained on a Scott tester and wrinkle recovery on a Monsanto crease-angle tester. All of these tests are standard tests in the textile industry and are described in the Technical Manual and Year Book of the American Association of Textile Chemists and Colorists for 1955.

The following examples are given primarily by way of illustration in order that the present invention may be more fully understood. No details therein should be construed as limitations on the present invention, except as they appear in the appended claims. All parts and percentages are by weight unless otherwise designated.

*Example 1*

Three pieces of bleached unmercerized 80″ x 80″ cotton were wet out in a three-pad bath of the following composition:

A. *Bath.*—The first bath contained 5.15 parts of dimethoxy trimethylol melamine (80% solids) and 0.49 part of anhydrous magnesium chloride and sufficient water to make up 100 parts of solution.

B. *Bath.*—The second pad bath was prepared as above, except that 4.7 parts of a 25% oil-in-water emulsion of oxy dimethylene diacetate, prepared as indicated above, was added to the pad bath, replacing 4.7 parts of the water in the pad bath composition.

C. *Bath.*—The third pad bath was prepared as in B above, except that mixed oxy methylene diacetates were used in preparing the emulsion and bath, instead of the oxy dimethylene diacetate.

The bleached unmercerized 80″ x 80″ cotton pieces were wet out in each of the pad baths slowly and then passed through a padder which gave a pick-up of 85% on the fabric. Thereafter, the fabric was dried at about 180° F., then cured at 350° F. for 1.5 minutes. The resin add-on was 3.5%, based on the fabric weight, and the magnesium chloride catalyst in the treated bath was 12%, based on the weight of the resin solids.

The results of the three treatments and a control are indicated hereinbelow, wherein it is indicated that compositions containing aminoplast resins and the acylates of the present invention substantially improve wrinkle recovery.

| Treatment: | Total wrinkle recovery, degrees |
|---|---|
| Control | 150 |
| Bath A | 210 |
| Bath B | 246 |
| Bath C | 257 |

*Example 2*

80″ x 80″ cotton percale was wet out in a bath containing 5.15% of ethylene bis(oxymethylene)diacetate and 2.9% magnesium chloride catalyst. It was thereafter passed through a padder adjusted to provide a 100% wet pick-up dried for 2 minutes at 210° F. and cured for 2 minutes at 300° F.

The treated piece had a wrinkle recovery of 240° and a tensile strength of 41 pounds. A similar untreated piece had a wrinkle recovery of 148° and a tensile strength of 97 pounds.

*Example 3*

Three pad baths were prepared containing the following:

(D) Four parts of dimethoxy trimethylol melamine (80% solids), 0.48 part of anhydrous magnesium chloride and 95.52 parts of water.

(E) The same as (D) except that 2 parts of mixed oxy methylene diacetates were dissolved in 15 parts of acetone and added in place of 17 parts of water.

(F) Similar to (E) except that oxy dimethylene diacetate was used in place of the oxy mixed methylene diacetates.

Pieces of 80″ x 80″ bleached unmercerized cotton print cloth were wet out in each of the above baths and padded to give a 100% wet pick-up. Thereafter, the cloth was dried at 190° F. and cured for about 2 minutes at 350° F.

The treated pieces were tested as indicated below.

| Treatment | Wrinkle Recovery | | Total Tensile (Lb.) | Total Tear (Lb.) |
|---|---|---|---|---|
| | Initial, degrees | After 3 Chlorine Washes, degrees | | |
| (1) 4% melamine resin | 225 | 207 | 63 | 3.23 |
| (2) 4% melamine resin + 2% OMD | 269 | 245 | 55 | 3.01 |
| (3) 4% melamine resin + 2% ODD | 244 | 246 | 60 | 2.59 |
| (4) Untreated | 160 | 159 | 93 | 3.03 |

The above table indicates that the wrinkle recovery of fabrics treated with the compositions of the present invention is better initially than those treated with conventional aminoplast resins alone, and are generally more durable. It further indicates that tensile strength values are generally as good as when the fabric is treated only with melamine resin and that tear strength values are generally equivalent to that of untreated cloth.

*Example 4*

All viscose rayon fabrics were treated with pad bath having the composition indicated below. In addition to the resin, 1.2% magnesium chloride, based on the weight of the solution, was present in each treating bath. The padder was adjusted to impart a 100% wet pick-up, and the fabric was dried at 175° F. and the resin cured at 300° F. for 2 minutes.

| Percent Solids in Bath and on Weight of Fabric | | Percent Shrinkage |
|---|---|---|
| Dimethoxytrimethylolmelamine | ODD [1] | |
| Control | | 12.5 |
| 10 | 0 | 3.1 |
| 8 | 2 | 1.7 |
| 6 | 4 | 2.2 |
| 4 | 6 | 2.5 |
| 2 | 8 | 3.9 |
| 0 | 10 | 3.9 |

[1] ODD (25% solids) oil-in-water emulsions used here prepared as above.

As will be noted, certain combinations set forth in the table above indicate that a synergistic effect with reference to shrinkage control is obtained, when the treated fabric is cellulosic viscose rayon. Thus, it will be noted that where the melamine resin and the ODD are present in percent by weight of 8–2, 6–4, and 4–6, respectively, based on the dry weight of the fabric, shrinkage control of an unexpected high order is obtained. Thus, when the treated fabric is viscose rayon, unexpected shrinkage control is obtained when an aminoplast resin and acylates are employed in percents of from 8:2 to 4:6, respectively, based on the weight of the rayon.

*Example 5*

80″ x 80″ cotton percale was treated with baths having the indicated compositions, padded to a 100% pick-up, dried for 2 minutes at 225° F. and cured 1½ minutes at 350° F. It was then tested for color at 450 mμ.

| Percent Solids on Fabric | Yellowing Index | |
|---|---|---|
| | Initial | 9 LCW [1] |
| (1) Untreated | 2.7 | 0.2 |
| (2) 5% dimethoxytrimethylolmelamine (M) | 3.4 | 15.9 |
| (3) 5% ODD | 4.7 | 0.6 |

[1] Laundromat chlorine washes.

The above table indicates that only the untreated piece and that treated with 5% ODD improved their yellowing index after 9 Laundromat chlorine washes, and that the piece treated with melamine resin had a poorer yellowing index after the same number of washes.

*Example 6*

80″ x 80″ cotton percale was treated with a pad bath solution containing 10% of oxy dimethylene diacetate, 40% magnesium chloride, and the pad was adjusted to impart an 85% wet pick-up. These compositions were imparted (1) from an acetone water solution and (2) from a non-ionic surface active agent containing solution prepared as set forth above. The results are recorded in the following table.

| | Total Wrinkle Recovery | | Total Tensile | |
|---|---|---|---|---|
| | Initial | 3 LCW | Initial | 3 LCW |
| (1) | 260 | 258 | 21 | 18 |
| (2) | 245 | 236 | 22 | 26 |

These results indicate that wrinkle recovery is better initially and more durable when applied from an acetone water solution than from a non-ionic surface active agent solution, but that the tensile strength of fabric treated with the former is lower after chlorine washing.

Another important aspect of this invention is that while the diesters of this invention are believed to decompose when cured to give up formaldehyde, or formaldehyde bearing fragments, most of the obnoxious odors which accompany formaldehyde are done away with.

The terms "textile" and "textile materials" as used herein and in the appended claims include filaments, fibers, threads, yarns, twisted yarns, etc. as such or in woven, non-woven, or otherwise formed fabrics, sheet cloths, and the like.

Although the invention has been described with particular emphasis to the treatment of the fabric consisting entirely of cellulosic material, it is applicable to those fabrics containing a major portion of cellulose, for example, 50% and more. While the invention has been illustrated specifically with reference to cotton or viscose rayon fabric, the invention herein described may also be applied to other textiles which are composed of cellulose or regenerated cellulose, examples of which include linen, hemp, jute, ramie, sisal, viscose rayons, cuprammonium rayons, and mixtures thereof, with each other or with cotton, or with other non-cellulosic materials.

Obviously, other additives may be included in the treating compositions, which do not detract from their effectiveness, such as stiffeners, softeners, lubricants, and the like.

We claim:

1. A process which comprises applying to textile materials containing cellulose to impart shrinkage control and wrinkle resistance thereto a composition comprising a diester having the following general formula:

wherein R is selected from the group consisting of H and alkyl, $n$ is an integer greater than $-1$, $m$ is an integer greater than 0, and $p$ is 1, except where $n$ is 0, when $p$ can be a value selected from the group consisting of 0 and 1, and an acid acting accelerator therefor, heating the treated material to a temperature of between 300° F. and 450° F. for a period of time sufficient to obtain the desired modification of the material.

2. A process according to claim 1 in which the diester is the diacetate of oxy dimethylene glycol.

3. A process according to claim 1 in which the diester is the diformate of oxy dimethylene glycol.

4. A process according to claim 1 in which the diester is the diacetate of ethylene bis(oxy dimethylene) glycol.

5. A process comprising applying to textile materials containing cellulose to impart shrinkage control and wrinkle resistance thereto a composition comprising a heat curable aminoplast resin and a diester having the following general formula:

wherein R is selected from the group consisting of H and alkyl, $n$ is an integer greater than $-1$, $m$ is an integer greater than 0, and $p$ is 1, except where $n$ is 0, when $p$ can be a value selected from the group consisting of 0 and 1, and an acid acting accelerator therefor, said composition containing from 1 to 25% of said heat curable aminoplast and from between 0.5 and 15% of said diester based on the dry weight of the textile material, heating the treated material to a temperature of between 300 and 450° F. for a period of time sufficient to obtain the desired modification of the material.

6. A process according to claim 5 wherein the textile material contains viscose rayon, and the composition comprises the diacetate of oxy dimethylene glycol and a water-soluble melamine formaldehyde condensate, which composition contains from between 4 and 8% of said melamine condensate and from between 2 and 6% of said diacetate.

7. A process according to claim 5 in which the textile material is cotton, and in which the aminoplast resin is a water-soluble melamine formaldehyde condensate.

8. A process according to claim 5 in which the textile material contains viscose rayon and the aminoplast resin is a water-soluble melamine formaldehyde condensate.

9. A process according to claim 5 in which the diester is the diacetate of oxy dimethylene glycol.

10. A process according to claim 5 in which the diester is the diformate of oxy dimethylene glycol.

11. A process according to claim 5 in which the diester is the diacetate of ethylene bis (oxy dimethylene) glycol.

12. A composition for treating textile materials comprising a diester, a heat-curable aminoplast resin and an acid acting accelerator therefor, said diester having the following general formula:

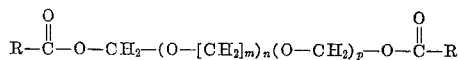

wherein R is selected from the group consisting of H and alkyl, $n$ is an integer greater than $-1$, $m$ is an integer greater than 0, and $p$ is 1, except when $n$ is 0, when $p$ can be a value selected from the group consisting of 0 and 1.

13. A textile material containing cellulose, characterized by shrinkage control and wrinkle resistance, having thereon a heat cured diester having the following general formula:

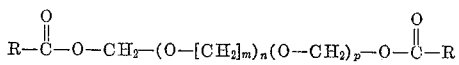

wherein R is selected from the group consisting of H and alkyl, $n$ is an integer greater than $-1$, $m$ is an integer greater than 0, and $p$ is 1, except when $n$ is 0, when $p$ can be a value selected from the group consisting of 0 and 1.

14. A textile material containing cellulose characterized by wrinkle resistance and shrinkage control, having thereon a heat cured diester having the following general formula:

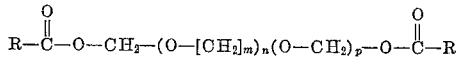

wherein R is selected from the group consisting of H and alkyl, $n$ is an integer greater than $-1$, $m$ is an integer greater than 0, and $p$ is 1, except where $n$ is 0, when $p$ can be a value selected from the group consisting of 0 and 1, and a water-insoluble aminoplast resin.

15. A textile material containing cellulose, having thereon from 0.5 to 15% based on the dry weight of the textile material of a heat cured diester having the following general formula:

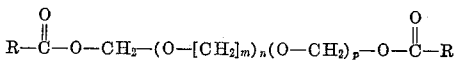

wherein R is selected from the group consisting of H and alkyl, $n$ is an integer greater than $-1$, $m$ is an integer greater than 0, and $p$ is 1, except where $n$ is 0, when $p$ can be a value selected from the group consisting of 0 and 1, and from between 1 and 23% based on the dry weight of the textile material of a water-insoluble aminoplast resin.

16. A textile material according to claim 15 containing about 2 to 6% of the diester and 2 to 10% of the aminoplast resin.

17. A viscose rayon textile material according to claim 15 containing from about 2 to 6% of the diester and 2 to 10% of the aminoplast resin.

18. A cotton textile fabric according to claim 15 in which the diester is the diacetate of oxy dimethylene glycol and the aminoplast resin is a water-insoluble melamine formaldehyde condensate.

19. A cotton textile fabric according to claim 15 in which the diester is the diformate of oxy dimethylene glycol, and the aminoplast resin is a water-insoluble melamine formaldehyde condensate.

20. A cotton textile fabric according to claim 15 in which the diester is the diacetate of ethylene bis (oxy dimethylene) glycol, and the aminoplast resin is a water-insoluble melamine formaldehyde condensate.

References Cited in the file of this patent

UNITED STATES PATENTS

Re. 23,866     Ericks _____ Sept. 14, 1954

FOREIGN PATENTS 731,789     Great Britain _____ June 15, 1955